United States Patent Office 3,632,559
Patented Jan. 4, 1972

---

3,632,559
CATIONICALLY ACTIVE, WATER SOLUBLE POLYAMIDES
Max Matter, Basel, and Rolf Oberholzer, Riehen, Basel-Stadt, Switzerland, assignors to Sandoz Ltd., Basel, Switzerland
No Drawing. Filed Sept. 30, 1968, Ser. No. 763,978
Claims priority, application Switzerland, Sept. 28, 1967, 13,569/67
Int. Cl. C08g 20/38
U.S. Cl. 260—78 SC               1 Claim

---

ABSTRACT OF THE DISCLOSURE

Novel cationically active, water soluble polyamides obtained by the alkylation with a bifunctional alkylation agent until the alkylation agent is used up, of a reaction product resulting from the reaction of a dicarboxylic acid or a functional derivative thereof with a polyalkylenepolyamine are produced, exemplified alkylation agents having the formula

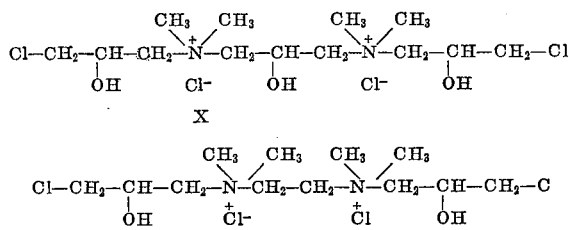

exemplified reaction products of a dicarboxylic acid with a polyalkylenepolyamine being the reaction products of diethylenetriamine with adipic acid, of diethylenetriamine and triethylenetetramine with adipic acid, of bis-(3-aminopropyl)-amine with adipic acid and N,N′-bis-[3-aminopropyl]-1,4-diamino-butane with adipic acid dimethyl ester; the use of these exemplified cationically active, water soluble polyamides as drainage aids, retention agents and flotation agents in connection with relatively thick paper or cardboard manufacture is also exemplified.

SUMMARY OF THE INVENTION

The present invention provides a water soluble polyamide which is cationically active, resulting from the alkylation with a bifunctional alkylation agent of the Formula II $$Z-CH_2-N \overset{R_1}{\underset{+}{\diagdown}} \overset{R_2}{\diagup} \left[ -Y-N \overset{R_1}{\underset{+}{\diagdown}} \overset{R_3}{\diagup} \right]_x -CH_2-Z \qquad \text{II}$$

wherein:
$x$ is zero or a whole number up to 7,
Z is selected from

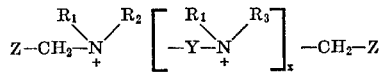

and

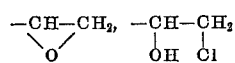

each of $R_1$ and $R_2$ is selected from lower alkyl and lower hydroxy alkyl radicals,
Y is selected from alkylene radicals with from 2 to 6 carbon atoms, 2-hydroxy-1,3-propylene radicals, and the radicals
—CH$_2$—CH$_2$—NH—CO—NH—CH$_2$—CH$_2$— and
—CH$_2$—CH$_2$—CH$_2$—NH—CO
—NH—CH$_2$—CH$_2$—CH$_2$—, until the alkylation agent is used up, of the reaction product in the molecular proportion of 0.85:1 to 1.2:1 of (i) a substance selected from a dicarboxylic acid of the Formula I $$HOOC-C_mH_{2m}-COOH \qquad (I)$$

in which $m$ is a whole number of from 4 to 8, and a functional derivative thereof with (ii) a polyalkylene polyamine containing (a) two primary amino radicals, (b) at least one secondary amino radical and (c) at least two alkylene radicals.

As used herein, the term "lower" designates alkyl radicals or hydroxy alkyl radicals with from 1 to 4 carbon atoms.

The present invention also provides a process for the production of the above cationically active, water soluble polyamides which is characterized in that a polyalkylenepolyamine which contains two primary amino radicals, at least one secondary amino radical and at least two alkylene radicals with 2 to 4 carbon atoms, is reacted with a dicarboxylic acid of the formula $$HOOC-C_mH_{2m}-COOH \qquad (I)$$

in which $m$ is a whole number of from 4 to 8, or with a functional derivative of said dicarboxylic acid, the molecular proportion being 0.85:1 to 1.2:1, and the reaction product (which is subsequently designated as a polyamide or intermediate product) is alkylated in aqueous solution with a bifunctional alkylation agent of the formula $$Z-CH_2-N \overset{R_1}{\underset{+}{\diagdown}} \overset{R_2}{\diagup} \left[ -Y-N \overset{R_1}{\underset{+}{\diagdown}} \overset{R_2}{\diagup} \right]_x -CH_2-Z \qquad (II)$$

wherein:
$x$ is zero or a whole number up to 7,
Z is selected from

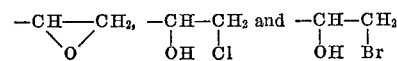

each of $R_1$ and $R_2$ is selected from lower alkyl and lower hydroxy alkyl radicals,
Y is selected from alkylene radicals with from 2 to 6 carbon atoms,
2-hydroxy-1,3-propylene radicals,
—CH$_2$—CH$_2$—NH—CO—NH—CH$_2$—CH$_2$— and
—CH$_2$—CH$_2$—CH$_2$—NH—CO—NH—CH$_2$—CH$_2$
—CH$_2$—, until the alkylation agent is used up, the amount of the bifunctional alkylation agent being chosen in such a way that the alkylation product remains in solution.

In order to produce the end product there is used, for example, as starting material a polyamide which may be obtained from diethylenetriamine $$H_2N-CH_2-CH_2-NH-CH_2-CH_2-NH_2 \qquad (III)$$

and $$HOOC-(CH_2)_4-COOH \text{ (adipic acid)} \qquad (IV)$$

or its salt with III, and which polyamide corresponds to the formula $$\sim HN-CH_2-CH_2-NH-CH_2-CH_2-NH-CO-(CH_2)_4-CO\sim \qquad (V)$$

The polyamide used in the process of the present invention may be obtained by a method known per se, for example from triethylenetetramine, tetraethylenepentamine, tri-(1,2-propylene)-tetramine, di-(1,3-propylene)-triamine and di-(1,4-butylene)-triamine.

The "polyalkylenepolyamine" required for this purpose corresponds to the formula $$H_2N-C_pH_{2p}(NH-C_pH_{2p})_qNH_2 \quad (VI)$$

in which:

$p$ is a whole number from 2 to 4 and
$q$ is a whole number from 1 to 4.

The dicarboxylic acid of the Formula I is a known compound and may be converted to the corresponding salt with the polyalkylenepolyamine, for example in concentrated aqueous solution; by heating such a salt there is produced a polyamide of the formula $$\sim HN-C_pH_{2p}(NH-C_pH_{2p})_qNH-CO-C_mH_{2m}-CO\sim \quad (VII)$$

by splitting off water. Such a polyamide is likewise obtained when, instead of the free dicarboxylic acid I there is used a functional derivative thereof, for example its anhydride, methyl ester or chloride, it being possible in this way to obtain the polyamide under milder conditions.

The bifunctional alkylation agent of the Formula II (hereinafter also referred to as cross linking agent) may be obtained by reaction of epichlorohydrin with a secondary amine of the formula

wherein each of $R_1$ and $R_2$ is selected from lower alkyl or lower hydroxy alkyl radicals, or with a bis-tertiary amine of the formula $$\begin{matrix} R_1 & & R_1 \\ & N-Y-N & \\ R_2 & & R_2 \end{matrix} \quad (IX)$$

in which Y is selected from alkylene radicals with from 2 to 6 carbon atoms and radicals of the formula —CH$_2$—CH$_2$—NH—CO—NH—CH$_2$—CH$_2$— and
—CH$_2$—CH$_2$—CH$_2$—NH—CO—NH—CH$_2$—CH$_2$—CH$_2$—, and each of the symbols $R_1$ and $R_2$ has the above significance, or with a mixture of an amine VIII and IX.

In this reaction it is possible to use the free amine of the Formulae VIII and IX or salts thereof, for example the hydrochlorides or sulphates, in aqueous solution. For example from 2 mols of dimethylamine, 1 mol of hydrochloric acid and 3 mols of epichlorohydrin in the presence of water there is obtained a suitable bifunctional cross linking agent according to the following reaction scheme:

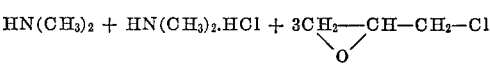
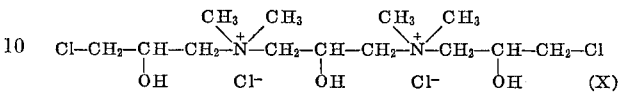

By altering the molar ratio it is possible to obtain analogous compounds of different chain lengths according to this scheme, for example:

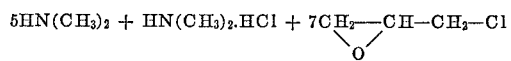
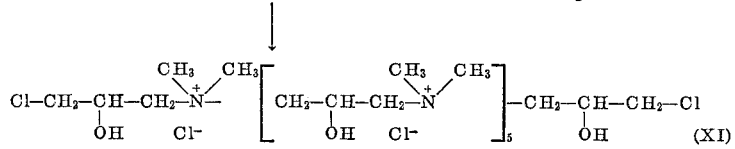

Another type of bifunctional alkylation agent is obtained from bis-tertiary amines and epichlorohydrin, for example:

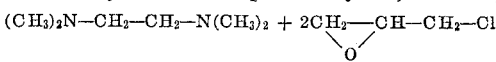
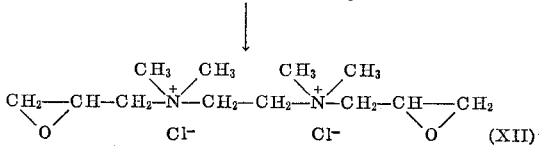

or:

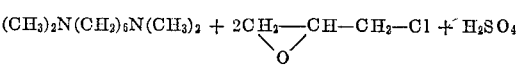
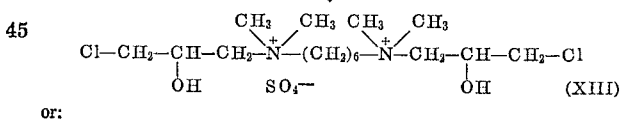

or:

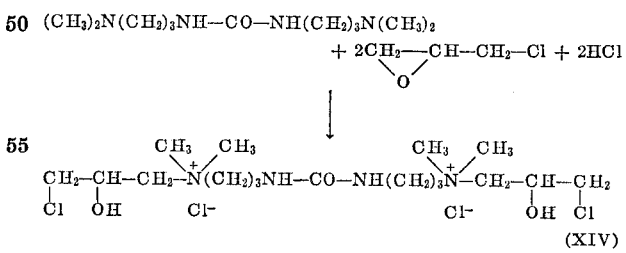

When $x$ in the Formula II is greater than 2, the symbols Y in that formula as well as in the bifunctional alkylation agent XI may be equal to one another or different from one another.

An example of the last mentioned case is the following reaction product:

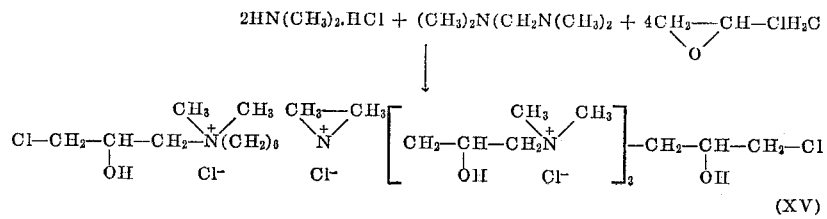

The last step of the process of the present invention deals with the alkylation of the polyamide of the Formula VII with the bifunctional alkylation agent of the Formula II. By this reaction molecules of the polyamide VII are linked to one another by the alkylation agent II in that the secondary and any primary amino groups still present in VII are alkylated by the epoxy- or halogenohydrin groups of II. For this reason this polyalkylation may also be designated as a cross linking reaction, since cross linked macromolecules result. When the polyamide V is used as starting material the cross linking bridges in these macromolecules have the following structure:

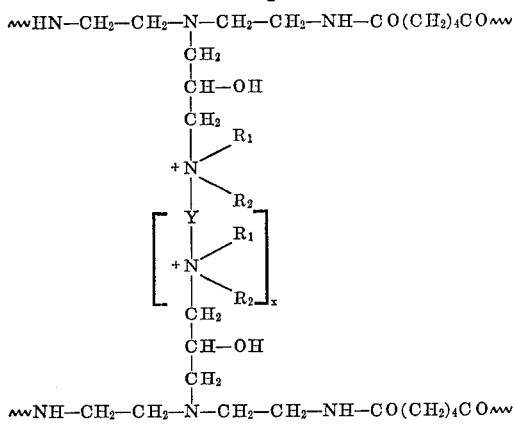

The cross linking (i.e. polyalkylation) may easily be effected in aqueous solution so as to obtain the cationically active, water soluble polyamides of the present invention.

The numerical relationship of polyamide to cross linking or polyalkylation agent is of great importance. If too much cross linking agent is used, a water insoluble end product is obtained which is outside the scope of the present invention. In accordance with the invention the amount of bifunctional alkylation agent is adjusted in such a way that a high molecular product is obtained which is still water soluble. Preferably cross linking is effected with as much as possible of the cross linking agent, so that on increasing slightly the amount used there would be produced a water insoluble cross linked product, because in this way there results a highly effective end product which is superior to a less cross linked product. If the greatest permissible amount of polyalkylation agent for a particular concentration of the reaction partners at a particular temperature as designated as 100%, working should be effected with at least 80% of polyalkylation agent, preferably with 90–100%. In general, a product obtained with 90–95% polyalkylation agent is an especially active retention agent and the end product which is polyalkylated to an even greater extent is a highly effective dehydration agent (i.e. filtration accelerator) and flotation aid for use in the paper or cardboard industry.

The carrying out of the cross linking is very simple; it is sufficient to dissolve the polyamide and the cross linking agent in water and to allow them to react with one another. The reaction may be speeded up by increasing the temperature and the concentration. In general, it is advantageous to effect the cross linking slowly, so that an evenly cross linked end product results. On polyalkylating in concentrated solution appreciably less cross linking agent is necessary, in comparison to the polyamide used, than in dilute solution, so as to obtain a cross linked product having the highest degree possible of cross linking, but which is still just water soluble. It is important that alkylation should be exhaustive, i.e. that all epoxy- or halogenohydrin groups in the cross linking agent capable of effecting alkylation are reacted; otherwise, an end product results which is not stable to storing and this may be converted on ageing to a water insoluble product by slowly continuing alkylation. A high molecular product produced in accordance with the invention should remain water soluble on heating to 90° C. for 2 hours at pH values between 8 and 9; this would not be the case if the bifunctional alkylation agent is incompletely reacted. The criterion for water solubility of the product is that 10 g. thereof on dissolution in one litre of distilled water gives rise to homogeneous clear solution.

The cationically active, high molecular polyamide of the invention contains in the cross linking bridges at least one quaternary ammonium ion. The cross linking bridges consist of chain-like molecule portions of which the chain contains at least six carbon atoms and at least one nitrogen atom; this is due to the structure of the bifunctional alkylation agent (Formula II). By these constitutional characteristics and the good stability to storing mentioned above the cationically active, high molecular polyamide of the invention is fundamentally differentiated from the known, comparable compounds (compare, for example, U.K. patent specification No. 979,461).

The cationically active water soluble polyamides of the present invention contain various basic groups, namely the quaternary ammonium ions in the cross linking bridges, the non-alkylated secondary amino groups and the tertiary amino groups which result on cross linking, so to speak as "bridge-heads of the cross linking bridges." The secondary and tertiary amino groups may be present in the free form or as a salt, for example in the form of a salt which is formed on cross linking when reaction is effected with an alkylation agent of the Formula II containing halogenohydrin groups.

At the end of the process of the invention the water soluble, cationically active polyamides result in the form of an aqueous solution; this aqueous solution may have its pH value adjusted to that required for a specific use. The pH value may vary within wide limits, for example between 2 and 12. The pH value which results normally by the method of production, which value is between about 8 and 9.5, may be increased, for example, by the addition of sodium hydroxide, or it may be reduced by the addition of an acid, for example hydrochloric, sulphuric, formic or tartaric acid.

The present invention further includes the use of the compounds of the present invention. They are highly effective flocculation agents which may be used for speeding up the sedimentation and flotation of technically important processes. The cationically active, high molecular polyamides of the present invention alternatively or additionally are valuable retention agents in the paper industry, becasue the fine cellulose fibres and inorganic fillers are retained by them on the sieve during sheet formation; furthermore, they speed up the water removal or the filtration process on the sieve of the paper machine and this feature is especially valuable in the manufacture of thick paper and cardboard. The cationically active, high molecular polyamides of the present invention have appreciable advantages over other retention agents and water removal accelerators used in the paper and cardboard industry: the paper treated with the products of the present invention is less subject to yellowing and the effectiveness of the optical brighteners in the paper is reduced to a lesser degree. Furthermore, the wet strength of the paper and cardboard is not appreciably increased by the compounds of the present invention which facilitates the working up of the waste paper. The polyamides of the present invention additionally or alternatively may be used as accelerators of the filtration procedure in the manufacture of cellulose, by which filtration the cellulose is separated from water.

The invention also includes water soluble polyamides which are cationically active, resulting from the exhaustive alkylation with a bifunctional alkylating agent, obtained by reacting (i) about 1 mol of dimethylamine, (ii) about 1 mol of dimethylammonium chloride and (iii) about 3 mol of epichlorohydrin, of a starting material polyamide obtained by reacting (a) about 1 mol of diethylenetriamine and (b) about 1 mol of adipic acid, the mol ratio between the bifunctional alkylating agent and the starting material polyamide being 20–25:100. The reaction of (i), (ii) and (iii) on the one hand, and (a) and (b) on the other hand, may be effected as indicated above.

The following examples illustrate the invention; all parts and percentages are by weight and temperatures are stated in degree centigrade.

(A) MANUFACTURING EXAMPLES

(1) Production of the intermediate product (1.1) 109 kg. (1.06 kg. mol) of diethylenetriamine are diluted with 40 kg. of water in a vessel provided with a stirrer while applying external cooling in such a way that the internal temperature remains below 70°. Thereafter 146 kg. (1.00 kg. mol) of powdered adipic acid are added sufficiently slowly for the inner temperature to be maintained at 50–90° by external cooling. The vessel with stirrer is closed and provided with a fractionating column which is joined to a descending cooler. Thereafter, during 1 hour, heating to 120–130° by means of an oil bath under an atmosphere of nitrogen is effected followed by heating during 6 hours to an internal temperature of 170–175°. The water used for dissolution and that which results during the condensation is thus distilled off through the column, but less than 0.4 kg. of diethylenetriamine is entrained in this way by the water vapour. Stirring is continued for a further 3 hours at 170–175° and the column with the descending cooler is then replaced with a reflux condenser. After cooling to 150–160°, 219 kg. of water are added in such a way that the inside temperature gradually falls to 100–105° under continuous reflux. Boiling is continued for one hour under reflux; after cooling, a clear solution of the intermediate product is obtained which contains 50% of solid substance.

(1.2) The procedure is effected as described at 1.1, but 0.97 mol (instead of 1.06 mol) of diethylenetriamine per mol of adipic acid are used.

(1.3) 51.5 g. (0.5 mol) of diethylenetriamine and 87.7 g. (0.6 mol) of triethylenetramine are dissolved in 50 g. of water as described at 1.1, whereupon 146 g. (1 mol) of adipic acid are added. Heating in an atmosphere of nitrogen to 175° is slowly effected; during this heating the evaporating water is distilled off with the use of a small fractionating column. After 3 hours at 175°, the fractionating column is replaced with a reflux condenser. After cooling to 150°, 266 g. of water are slowly run in in such a way that the solution constantly boils and that the inside temperature is 103–106° at the end. After boiling for one hour, a clear solution is obtained which contains 50% of polyamide, of which part has one basic NH— and another part has two basic NH— groups between the acid amide groups.

A condensate having the same constitution results on heating 0.5 mol of diethylenetriamine, 0.6 mol of triethylenetetramine and 1 mol of adipic acid dimethyl ester, methanol being split off which begins at 100° and can be completed by heating to 150°.

(1.4) The procedure is as in Example 1.1, but the 109 kg. of diethylenetriamine are replaced with 131 kg. (1 kg. mol) of bis-(3-aminopropyl)-amine. A clear, 50% aqueous solution of intermediate product results; on storing at room temperature no solid material precipitates.

(1.5) On stirring 233 g. (1.15 mol) of Spermin (i.e. N,N′-bis-[3-aminopropyl]-1,4-diamino-butane) with 174 g. (1 mol) of adipic acid dimethyl ester and heating in an atmosphere of nitrogen to 150–155° until the splitting off of methanol is completed, an intermediate product is obtained which is soluble in water and can be converted to a water soluble, cationically active polyamide with the cross linking agent described in Example 2.1.

(2) Production of the cross linking agent (2.1) 205.5 kg. of ice are mixed with 112.5 kg. of 40% dimethylamine solution (1 kg. mol) in a kettle of stainless steel provided with a stirrer and 100 kg. of a 36.5% hydrochloric acid solution (1 kg. mol) are added in such a way that the inner temperature remains below 25°. A solution of dimethylammonium chloride of pH value 4–7 results. A further 112.5 kg. of a 40% dimethylamine solution (1 kg. mol) are added and then 277.5 kg. of epichlorohydrin are run in sufficiently slowly so that the internal temperature can be kept at 28–32° by external cooling. The reaction is allowed to go to completion at this temperature for a few hours and a clear solution results which contains 50% of cross linking agent of the Formula X above of sufficient purity.

Unreacted epichlorohydrin or non-ionogenic side products such as glycerin dichlorohydrin are practically absent, as may be seen from the fact that on shaking out between ether and water hardly anything is dissolved out in the ether.

On analysis there is found, per mol of crosslinking agent, 2 mol of Cl in ionogenic and 2 mol of Cl in non-ionogenic form.

(2.2 50 g. (0.5 mol) of 36.5% hydrochloric acid solution are stirred with 61.8 g. of water in a water bath at a temperature of 10–15° and 29 g. (0.25 mol) of N,N,N′,N′-tetramethylethylene-diamine are added dropwise sufficiently slowly for the inside temperature to remain below 40°. At a bath temperature of 20–25° 46.25 g. (0.5 mol) of epichlorohydrin are added, whereby two phases result. The bath temperature is adjusted to 40°; the inner temperature rises to 53° during 40 minutes, whereby the epichlorohydrin reacts and the mixture becomes a single phase one. Stirring is continued for 16 hours at 40° and a clear solution of pH value 7–7.1 results which contains 50% of cross linking agent of the formula

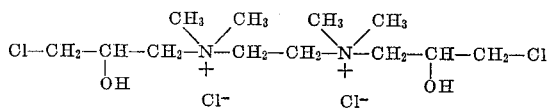

(3) Production of the end product (3.1) In this example the reaction of the intermediate product 1.1 with the cross linking agent 2.1 is described, cross linking being effected to the greatest extent possible. When working is carried out in aqueous solution having a 40% solid material content, the ratio of cross linking agent:intermediate product amounts to about 20:100. While at 30% concentration of Example 3.2, this ratio is about 25:100. Thus a useful range is 20 to 25:100 in the concentration range of 30 to 40%. As the two starting materials are not very pure and not uniform, it is necessary to determine the optimum ratio by preliminary trials in which a product results which is cross linked to the greatest extent possible and just remains water soluble, while using the quality of starting material available. For example, when 5 preliminary trials each of 50 g. have shown that with portions of 20.0, 20.2, 20.4, 20.6 and 20.8 parts of cross linking agent for every 100 parts of intermediate product the highest amounts (i.e. 20.6 and 20.8:100) lead to end products with insoluble portions, the large scale reaction is effected in the ratio of 20.3:100 in the following manner:

9.0 kg. of the 50% intermediate product described in Example 1.1 are mixed with 1.83 kg. of the 50% cross linking agent obtained in accordance with Example 2.1 and 2.7 kg. of water in a kettle, said kettle being equipped with a stirrer and capable of being heated by means of a water bath. The solution, which contains 40% of solid material, is stirred first for 2 hours at 25–35°, then for 2 hours at 45° and finally for 15 hours at 50–55°. The initially highly mobile solution gradually becomes viscous and after about 8 hours changes into a highly viscous paste having the tendency to rise on the stirrer. At the end of these operations the paste again becomes a little thinner.

The resulting cross linked product is an excellent accelerator for water removal in the cardboard industry (compare section B below).

In order to convert the resulting product into one which can be thinned easily, an equal amount of water is added at 50°. In this way a free flowing solution having a 20% solid content, pH value 8.8–8.9 and density 1.04 is obtained.

(3.2) In this example the intermediate product 1.1 is reacted with the cross linking agent 2.1 in the manner described at 3.1 above. However, working is effected in a solution having a solid material content of 30% (instead of the 40% solid material content in 3.1), so that in order to obtain a product which is cross linked to the greatest extent possible and still water soluble, an appreciably larger quantity of cross linking agent in relationship to the intermediate product is required. In the present case, however, one remains markedly below the greatest possible degree of cross linking and working is effected according to the following recipe.

10 kg. of the 50% intermediate product solution described in Example 1.1 is mixed with 2.52 kg. of the 50% cross linking agent solution obtained in accordance with Example 2.1 and with 8.38 kg. of water in a heatable kettle provided with stirrer. While stirring well, heating is effected during one hour to 90° in an atmosphere of nitrogen and that temperature is maintained during 2 hours. After cooling, a 30%, clear, fairly viscous solution of a cross linked, cationically active polyamide is obtained; it constitutes a valuable retention agent for fillers and fine grain additives used in paper making.

(3.3) Working is effected as in Example 3.1, but instead of the intermediate product 1.1, there is used the intermediate product 1.2. In order to obtain a product which is cross linked to the greatest possible extent and still water soluble, about three times less cross linking agent 2.1 is necessary than in Example 3.1, i.e. the ratio of cross linking agent:intermediate product amounts to about 6.7:100, as compared with about 20:100 in Example 3.1.

The resulting cationically active polyamide is obtained as a viscous, 20% aqueous solution. It is an excellent drainage agent for cellulose suspensions, and its effectiveness in the drainage test (compare B) is similar to that of the product produced according to Example 3.1.

(B) Drainage capacity of the end products

The measure for determining the drainage capacity is the time which is required for the issuance of a predetermined amount of filtrate from a suspension of unbleached cellulose containing drainage adjuvants as compared to the time required for the issuance of a corresponding amount of filtrate from an adjuvant-free suspension. The test method used is that described in Merkblatt V/7/61 of the "Verein der Zellstoff- und Papier-Chemiker und -Ingenieure."

In the following table, there is compared the effect on the filtration time in seconds of 3 commercially available products with that of the active agent described in Example 3.1. The concentration in percent signifies, taking into account the dry substance content, grams of active agent on 100 g. of air dried cellulose:

| | Concentration in percent | | | | | | |
|---|---|---|---|---|---|---|---|
| | 0.0 | 0.05 | 0.1 | 0.2 | 0.4 | 0.8 | 1.6 |
| Polymin HS [1] | 174 | 160 | 152 | 100 | 41 | 43 | 54 |
| Polymin FL [1] | 174 | 165 | 140 | 71 | 44 | 51 | 63 |
| Tydex 12 [2] | 174 | 156 | 132 | 70 | 35 | 37 | 44 |
| Example 3.1 | 174 | 113 | 88 | 50 | 16 | 7 | <5 |

[1] Name of product sold by Badische Anilin- und Sodafabrik.
[2] Name of product sold by Dow Chemical Inc.

The above figures clearly show that the three commercially available products are appreciably less active than the product produced according to Example 3.1.

(C) Examples of Use.—(i) Drainage

A very important problem in the manufacture of paper or of cardboard using waste paper is the drainage of the paper pulp on the machine wire, since drainage determines the speed of throughput of the paper pulp and thus the speed of production. With suitable adjuvants, for example with Polymin HS as listed in the immediately foregoing table, the drainage of the paper pulp can be speeded up, which enables an appreciably increase in the rate of production.

The effectiveness of the product of Example 3.1 was investigated in a cardboard factory on a Fourdrinier machine and compared with Polymin HS. The cardboard was produced with a weight of 280 g./m.$^2$ from paper pulp which contained 85 parts of newspaper, 15 parts of unbleached sulphite cellulose, 0.3 part of rosin size and 1.2 parts of aluminium sulphate, there being added in one run the product of Example 3.1 (containing 20% of dry substance) and in a second run Polymin HS as a 0.25% solution immediately before the flow box.

On adding 0.3% of the adjuvant, calculated on the air dry paper pulp, the product of Example 3.1 causes a better water removal than Polymin HS which as evidenced by the fact that the front of the water mirror was appreciably closer to the flow box and that the steam requirements per ton of dry cardboard were lower. The retention caused by the product of Example 3.1 was likewise better than that caused by the Polymin, a conclusion which was evidenced by the approximately 20% lower amount of material that has passed through the wire.

(ii) Retention

The effectiveness of the product of Example 3.2 was determined in a paper factory on a Fourdrinier machine and compared with Kymene 557 of Hercules Powder. Paper with a weight of 80 g./m.$^2$ was produced. The paper pulp contained 45 parts of bleached coniferous wood sulphite cellulose, 35 parts of bleached beech sulphite cellulose, 20 parts of mechanical wood pulp, 2 parts of rosin size, 3 parts of aluminium sulphate and 28 parts of kaolin. On adding the same amounts of both adjuvants, based on the dry substance content (0.01% calculated on the air dry paper pulp), immediately before the flow box, the product of Example 3.2 causes a better retention than the Kymene 557, which could be seen from a comparison of the filler content determined by incineration of paper samples.

(iii) Flotation

A groundwood containing wrapping paper was manufactured on a paper machine, said paper weighing 80 g. per m.$^2$ and having an ash content of 17%. The waste white water has a solid material content of 3110 mg. per litre and is worked up in the usual way in a save-all in order to regenerate the solid materials. The waste water after the save-all then still contains 1460 mg. of solid materials per litre.

When there is added to the waste water 0.5% or 0.8%—based on the solid material contained in the waste water—of the solution obtained in accordance with the last paragraph of Example 3.1, the waste water after the save-all contains only 78 or 25 mg. of solid materials per litre.

Although the present invention is described herein with particular reference to specific details, it is not intended that such details shall be regarded as limitations upon the scope of the invention except insofar as included in the accompanying claim.

We claim:

1. A water soluble cationic polymer of a polyalkylated polyamide produced by a process consisting essentially of alkylation with a bifunctional alkylation agent of the Formula II

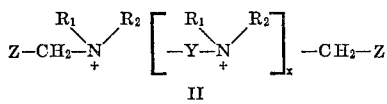

wherein
$x$ is zero or a whole number up to 7, Z is selected from

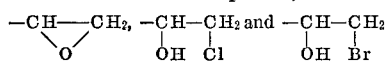

each of $R_1$ and $R_2$ is a lower alkyl radical,
Y is a 2-hydroxy-1,3-propylene radical, until the alkylation agent is used up, of the reaction product in the molecular proportion of 0.85:1 to 1.2:1 of (i) a substance selected from a dicarboxylic acid of the Formula I $$HOOC-C_mH_{2m}-COOH \quad (I)$$

in which $m$ is a whole number of from 4 to 8 or carboxyl-forming derivative thereof with (ii) a polyalkylenepolyamine containing (a) two primary amino radicals, (b) at least one secondary amino radical and (c) at least two alkylene radicals, the ratio of polyamide to alkylating agent being at least 80% of the greatest amount effective at a given concentration, to produce a substantially water soluble product.

References Cited

UNITED STATES PATENTS

| | | | |
|---|---|---|---|
| 2,882,185 | 4/1959 | Valko et al. | 260—78 |
| 2,998,295 | 8/1961 | Goldann | 260—78 |
| 3,159,612 | 12/1964 | Tsou et al. | 260—78 |
| 3,320,215 | 5/1967 | Conte et al. | 260—78 |
| 3,329,657 | 7/1967 | Strazdins et al. | 260—78 |

HAROLD D. ANDERSON, Primary Examiner

U.S. Cl. X.R.

162—164; 209—5; 210—54; 260—29.2 N, 78 TF